(12) United States Patent
Braucht et al.

(10) Patent No.: US 9,694,866 B2
(45) Date of Patent: Jul. 4, 2017

(54) AUDIBLE WARNING SYSTEM FOR BICYCLE LIGHTS

(71) Applicant: Serfas, Inc., Phoenix, AZ (US)

(72) Inventors: Erik Dean Braucht, Cave Creek, AZ (US); Riley Bullock, Phoenix, AZ (US); Raymond Kuipers, Scottsdale, AZ (US)

(73) Assignee: Serfas, Inc., Phoenix, AZ (US)

( * ) Notice: Subject to any disclaimer, the term of this patent is extended or adjusted under 35 U.S.C. 154(b) by 0 days.

(21) Appl. No.: 14/719,128

(22) Filed: May 21, 2015

(65) Prior Publication Data

US 2016/0339978 A1    Nov. 24, 2016

(51) Int. Cl.

| | |
|---|---|
| *B62J 3/00* | (2006.01) |
| *B62J 6/04* | (2006.01) |
| *G08B 3/10* | (2006.01) |
| *B62J 6/00* | (2006.01) |
| *G08B 21/18* | (2006.01) |
| *H05B 33/08* | (2006.01) |

(52) U.S. Cl.
CPC ............ *B62J 3/00* (2013.01); *B62J 6/003* (2013.01); *B62J 6/04* (2013.01); *G08B 3/10* (2013.01); *G08B 21/182* (2013.01); *H05B 33/0815* (2013.01); *H05B 33/0854* (2013.01)

(58) Field of Classification Search
CPC ............ B62J 3/00; B62J 6/003; G08B 3/10
USPC .................................................. 340/636.15
See application file for complete search history.

(56) References Cited

U.S. PATENT DOCUMENTS

| | | | | |
|---|---|---|---|---|
| 6,043,461 | A  * | 3/2000 | Holling | F24C 7/087 |
| | | | | 219/445.1 |
| 7,509,753 | B2 * | 3/2009 | Nicosia | G01F 23/04 |
| | | | | 33/716 |
| 2003/0067769 | A1 * | 4/2003 | Gilpin | F21L 4/027 |
| | | | | 362/184 |
| 2005/0099787 | A1 * | 5/2005 | Hayes | B60Q 11/002 |
| | | | | 362/20 |
| 2008/0099290 | A1 * | 5/2008 | Stern | A45C 5/03 |
| | | | | 190/109 |

OTHER PUBLICATIONS

Bontrager: Flare R Tail Light, retrieved via Internet: www.bontrager.com/model/13202 on May 12, 2015, 2 pages.

* cited by examiner

*Primary Examiner* — Joseph Feild
*Assistant Examiner* — John Mortell
(74) *Attorney, Agent, or Firm* — Blakely Sokoloff Taylor & Zafman LLP

(57) ABSTRACT

A bicycle light that includes a battery, a light source, a sound emitting device, and a control circuit is described. The light source when powered by the battery is capable of operating at a first power level and a second power level, where the second power level consumes less power than the first power level and where the first power level is associated with a first battery life threshold level. The control circuit is operable to detect that a remaining battery life of the battery has reached below the first battery life threshold level, cause the sound emitting device to emit sound when the remaining battery life of the battery reaches below the first battery life threshold level while the light source is operating at the first power level, and cause the light source to operate at the second power level upon detecting a user input.

19 Claims, 5 Drawing Sheets

AUDIBLE WARNING SYSTEM FOR BICYCLE LIGHTS

FIELD

An embodiment of the invention relates to a bicycle light, and more specifically, to a bicycle light that (1) alerts a user when a remaining battery life falls below a threshold level and (2) prolongs battery life by transitioning to an operating mode that consumes less power. Other embodiments are also described.

BACKGROUND

Cycling has increasingly become a popular mode of transportation, because it provides health benefits, it is environmentally friendly, and less expensive compared to alternative modes of transportation. Furthermore, cycling has also become a popular recreational activity.

Bicycle lights (e.g., tail lights) are an essential safety accessory for bicycle riders. Other than helmets, bicycle lights are widely considered the most important safety accessory for bicycle riders, as they allow the bicycle rider to be seen by others on the road. Bicycle lights are particularly important when the bicycle rider is riding at night or in weather conditions with limited visibility. Specifically, a properly functioning bicycle light allows motorists to view or otherwise become aware of the bicycle rider while on the road. Accordingly, riding a bicycle without a properly functioning bicycle light can be extremely hazardous for the bicycle rider as motorists may be unaware of the rider.

Bicycle lights are typically powered by a battery. The battery may be depleted after operating the bicycle light for a period of time, eventually causing the bicycle light to go out. However, the bicycle rider may not become aware of this until he or she gets off the bike or until it is too late and they are involved in a collision.

SUMMARY

An embodiment of the invention is a bicycle light that includes a battery, a light source, a sound emitting device, and a control circuit. The light source when powered by the battery is capable of separately operating at a first power level and a second power level, where the second power level consumes less power than the first power level and where the first power level is associated with a first battery life threshold level. The control circuit is operable to (1) detect that a remaining battery life of the battery has reached below the first battery life threshold level, (2) cause the sound emitting device to emit sound when the remaining battery life of the battery reaches below the first battery life threshold level while the light source is operating at the first power level, and (3) cause the light source to operate at the second power level upon detecting a user input.

The embodiment above provides an advantage that the user is audibly notified when the remaining battery life reaches below certain threshold levels. Thus, the user does not need to get off the bicycle or look behind while riding the bicycle to check the status of the battery. Also, the embodiment above gives the user the option to ramp down the light source to operate at a lower power level in order to prolong battery life or to stay at the current power level.

Another embodiment of the invention is a bicycle light that includes a battery, a light source, and a control circuit. The light source when powered by the battery is capable of separately operating at a first power level, a second power level, and a third power level, where the third power level consumes less power than the second power level and the second power level consumes less power than the first power level, and where the first power level is associated with a first battery life threshold level and the second power level is associated with a second battery life threshold level. The control circuit is operable to detect that a remaining battery life of the battery has reached below the first battery life threshold level, automatically cause the light source to operate at the second power level upon detecting that the remaining battery life of the battery has reached below the first battery life threshold level, detect that the remaining battery life of the battery has reached below the second battery life threshold level, and automatically cause the light source to operate at the third power level upon detecting that the remaining life of the battery has reached below the second battery life threshold level.

Another embodiment of the invention is a bicycle tail light that includes a battery, a light source, a sound emitting device, and a control circuit. The light source when powered by the battery is capable of operating at a plurality of power levels, where each power level is associated with a battery life threshold level. The control circuit is operable to automatically cause the light source to operate at a next power level and cause the sound emitting device to emit sound upon detecting that a remaining battery life of the battery reaches below a battery life threshold level associated with a current power level of the light source, where the next power level consumes less power than the current power level. Other embodiments are also described.

The embodiments above provide an advantage that the battery life is prolonged by automatically transitioning the light source to operate at lower power levels without requiring user input. This allows the user to focus his or her attention on the road instead of having to manually adjust the bicycle light settings while operating the bicycle, thus providing greater safety.

The above summary does not include an exhaustive list of all aspects of the present invention. It is contemplated that the invention includes all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it should be understood that some embodiments of the invention may be practiced without these details. In other instances, well-known circuits, structures, and techniques have not been shown in detail so as not to obscure the understanding of this description.

Bicycle lights (e.g., bicycle tail lights) are typically powered by a battery. Some bicycle lights may indicate that the battery is low or about to die by providing a small light-emitting diode (LED) that changes color (e.g., from green to red) or by changing the blinking pattern of the main LEDs. However, a drawback of these indicators, especially for tail lights, is that the user (e.g., bicycle rider) is facing forward when riding the bicycle and the tail light is located behind the user with the light projecting away from the user. As such, the user is not made aware of the low-battery status until the user looks behind at the tail light. Even then, the small LED indicator or change in blinking pattern of the main LEDs may be difficult to detect. Looking behind to check the battery status while operating the bicycle is very dangerous. Moreover, if the user does not look back, the user may not even be aware that the tail light battery has died and continue riding with a dead tail light, which is also very dangerous. Embodiments overcome some of these disadvantages by alerting the user, such as by providing an audible notification to the user when the remaining battery life reaches below certain threshold levels and giving the user the option to ramp down the light source to operate at a lower power level in order to prolong battery life or to stay at the current power level. Also, some embodiments provide an advantage that the battery life is prolonged by automatically transitioning the light source to operate at lower power levels without requiring user input.

Figure 1A:
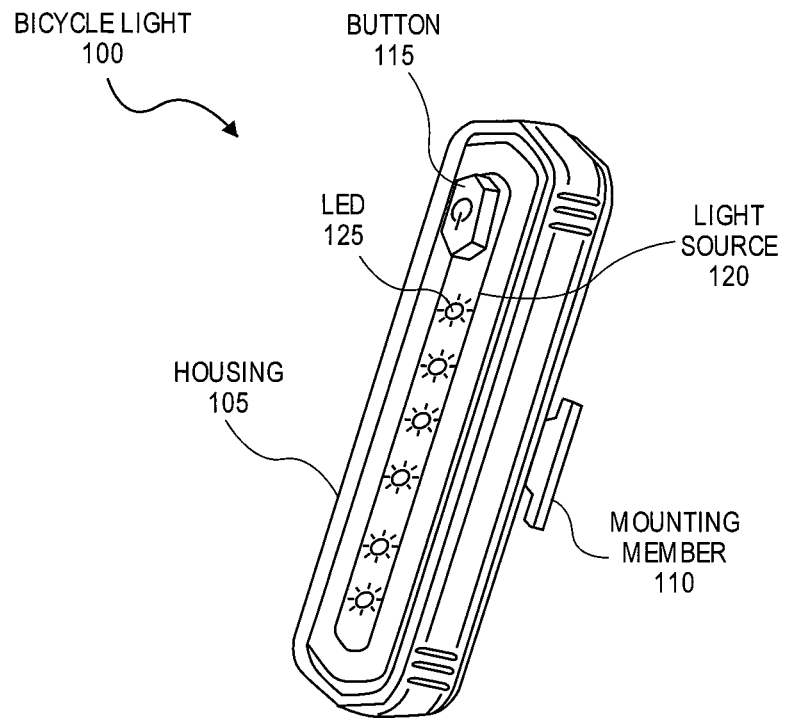
FIG. 1A is a top perspective view of a bicycle light in accordance with an embodiment of the present invention.

FIG. 1A is a top perspective view of a bicycle light in accordance with an embodiment of the present invention. The bicycle light 100 may be a tail light or other type of safety light (e.g., a front safety light or side safety light). The bicycle light 100 includes a housing 105 with a mounting member 110 attached thereto for removable attachment to a mount on a bicycle. The bicycle light 100 may also include a button 115 that protrudes from or is located on a surface of the housing 105 for controlling the operations of the bicycle light 100. In one embodiment, the button 115 can be a push-button such as a spring return button. Although FIG. 1A illustrates the button 115 as being located on a surface of the housing, the button 115 can also be located separate from the housing 105. For example, the button 115 can be located on a separate device that communicates with the bicycle light 100 over a wireless or wired connection. Such an embodiment allows the button 115 to be placed near the user's/rider's hands when the user is operating a bicycle, instead of requiring the user to reach towards the bicycle light 100 to actuate the button 115. In one embodiment, the button 115 is integrated into a mobile device (e.g., as a virtual button on the display of the mobile device) that connects to the bicycle light 100 using Bluetooth technology or a similar short-range or long-range wireless communication technology.

The bicycle light 100 may also include a light source 120 that is operable to emit light into the surrounding area. In this fashion the light source 120 makes the user/rider more visible to motorists and other individuals who share the road with the user. In one embodiment, the light source 120 includes one or more light-emitting diodes (LEDs) 125. Although described herein as solely using LEDs, in other embodiments, the light source 120 may include one or more incandescent bulbs, fluorescent lamps, compact fluorescent lamps (CFL), cold cathode fluorescent lamps (CCFL), high-intensity discharge lamps, LEDs, or any combination thereof. In one embodiment, the light source 120 is capable of operating at one or more discrete power levels, where each power level consumes a different amount of power. For example, the light source 120 can operate at six different power levels as follows, listed in order of descending power consumption: power level 6—high steady light; power level 5—medium steady light; power level 4—low steady light; power level 3—high flashing light; power level 2—medium flashing light; and power level 1—low flashing light. The high steady light continuously displays light (i.e., without blinking/flashing) at a high intensity (e.g., 35 Lumens) and/or high power level (e.g., 6 Watts). The medium steady light continuously displays light at a medium intensity (e.g., 20 Lumens) and medium power level (e.g., 4 Watts). The low steady light continuously displays light at a low intensity (e.g., 10 Lumens) and/or low power level (e.g., 2 Watts). The high flashing light displays a blinking/flashing light at high intensity and/or high power level. The medium flashing light displays a blinking/flashing light at a medium intensity and/or medium power level. The low flashing light displays a blinking/flashing light at a low intensity and low power level. The six discrete power levels are provided by way of example and not limitation. In other embodiments, the light source 120 may have different number of power levels and each power level can have different light-display characteristics than those discussed above. For example, the light source 120 can display light that blinks more frequently when operating at a higher power level and that blinks less frequently when operating at a lower power level (given the same light intensity). In one embodiment, a user (e.g., bicycle rider) can cycle through the various power levels by actuating the button 115.

Figure 1B:
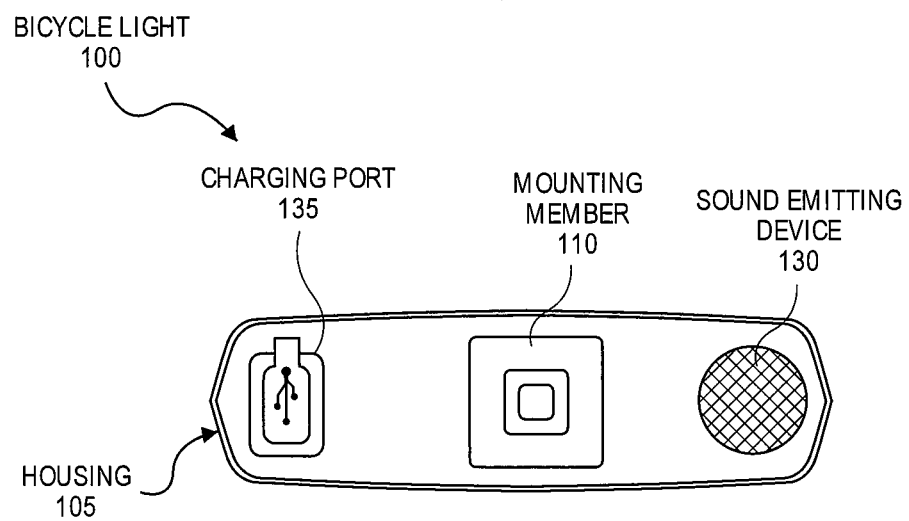
FIG. 1B is a rear view of the bicycle light in accordance with an embodiment of the present invention.

FIG. 1B is a rear view of the bicycle light 100 in accordance with an embodiment of the present invention. The bicycle light 100 includes a charging port 135 for charging a rechargeable battery (not shown) that powers the bicycle light 100. In one embodiment, the charging port 135 is capable of receiving a cable with a Universal Serial Bus (USB) connector. For example, the charging port 135 can be capable of receiving a cable with a standard USB port, mini-USB port, or micro-USB port connector. In other embodiments, the charging port 135 can receive cables using any other type of standardized connector or even a proprietary connector. Although described as rechargeable, in some embodiments the battery may be non-rechargeable. Instead, the non-rechargeable battery of the bicycle light 100 may be replaceable such that a new battery is used upon depletion of the old/used battery.

The bicycle light 100 also includes an alerting device operable to alert a user when the battery life reaches below a threshold level. In one embodiment, the alerting device may be a sound emitting device 130 that is operable to emit sound. In one embodiment, the sound emitting device 130 is a speaker, buzzer, bell, or similar device operable to emit sound. In one embodiment, an interface for adjusting the sound volume such as buttons (e.g., volume-up button and volume-down button) or a volume dial is provided on a surface of the housing 105. Although FIG. 1B illustrates the sound emitting device 130 as being integrated within the housing 105, the sound emitting device 130 can also be located separate from the housing 105. For example, the sound emitting device 130 can be located on a separate device that communicates with the bicycle light 100 over a wireless or wired connection. Such an embodiment allows the sound emitting device 130 to be placed in any location as desired by the user. For example, the sound emitting device 130 can be a wireless headset or wireless headphone that connects to the bicycle light 100 using Bluetooth technology or a similar short-range or long-range wireless communication technology. It should be further understood that although a sound emitting device 130 is described, the alerting device need not be limited to one that emits sound. For example, the alerting device could be a haptic device that provides a tactile feedback such as a vibration that will alert the user that the batter life has reached below a desired level.

As briefly mentioned above, a battery enclosed within the housing powers the light source 120, the sound-emitting device 130, and various circuitry (e.g., a control circuit) for controlling the functionality of the bicycle light 100. In one embodiment, as mentioned above, the bicycle light 100 is powered by a rechargeable battery. In other embodiments, the bicycle light 100 is powered by a non-rechargeable battery. In one embodiment, the housing 105 includes an internal battery compartment accessible from a surface of the housing 105 for insertion and removal of the battery. The housing 105 may also provide a cover over the battery compartment to secure the battery within the compartment.

Figure 2:
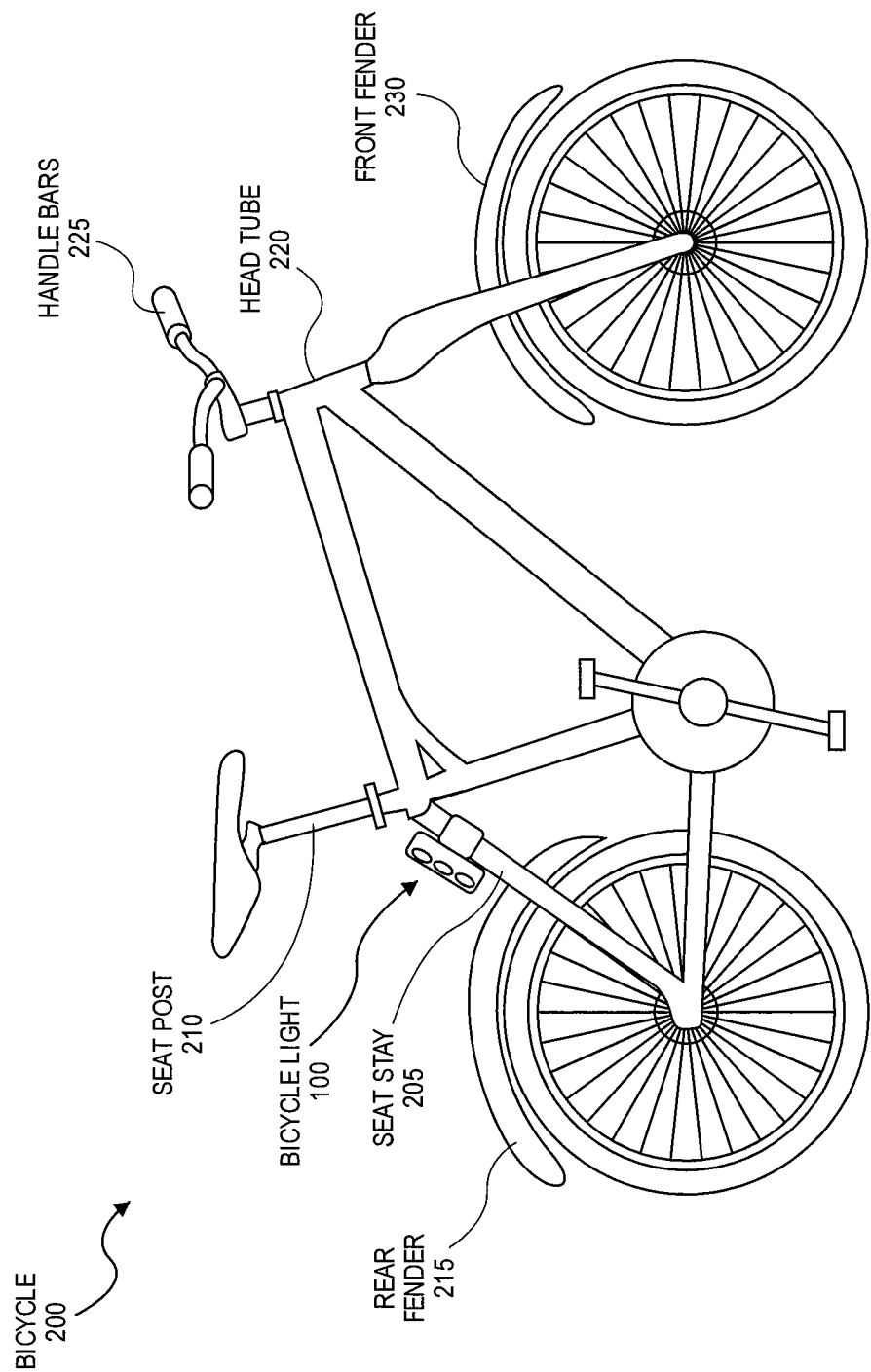
FIG. 2 is a side view of a bicycle illustrating various possible attachment locations for the bicycle light in accordance with an embodiment of the present invention.

FIG. 2 is a side view of a bicycle illustrating various possible attachment locations for the bicycle light 100 in accordance with an embodiment of the present invention. As shown, the bicycle light 100 is attached to the seat stay 205 of the bicycle 200 (i.e., the part of the frame of the bicycle 200 that connects the top of the seat tube to the rear dropout). The placement of the bicycle light 100 is shown by way of example and not limitation. In other embodiments, the bicycle light 100 can attach to other parts of the bicycle 200 as desired. For example, a bicycle light 100 that is to function as a tail light can attach to the seat post 210, the rear fender 215, or any rear portion of the bicycle 200. A bicycle light 100 that is to function as a front safety light can attach to the head tube 220, the handle bars 225, the front fender 230, or any front portion of the bicycle 200. In one embodiment, the bicycle light 100 attaches to an article worn by the user (e.g., bicycle rider), such as the rear/front of the helmet of the user or a backpack worn by the user.

In one embodiment, the bicycle light 100 is removably attachable to the bicycle 200 by engagement of the mounting member 110 with a corresponding mount attached to the bicycle 200. In other embodiments, the bicycle light 100 can be removably attached to the bicycle 200 using other types of mechanisms that allow for secure attachment and detachment. For example, the bicycle light 100 can be removably attached to the bicycle 200 using straps, hook-and-loop fasteners (e.g., Velcro®), snap-and-click mechanisms, threaded attachment mechanisms, or any combination thereof.

Figure 3:
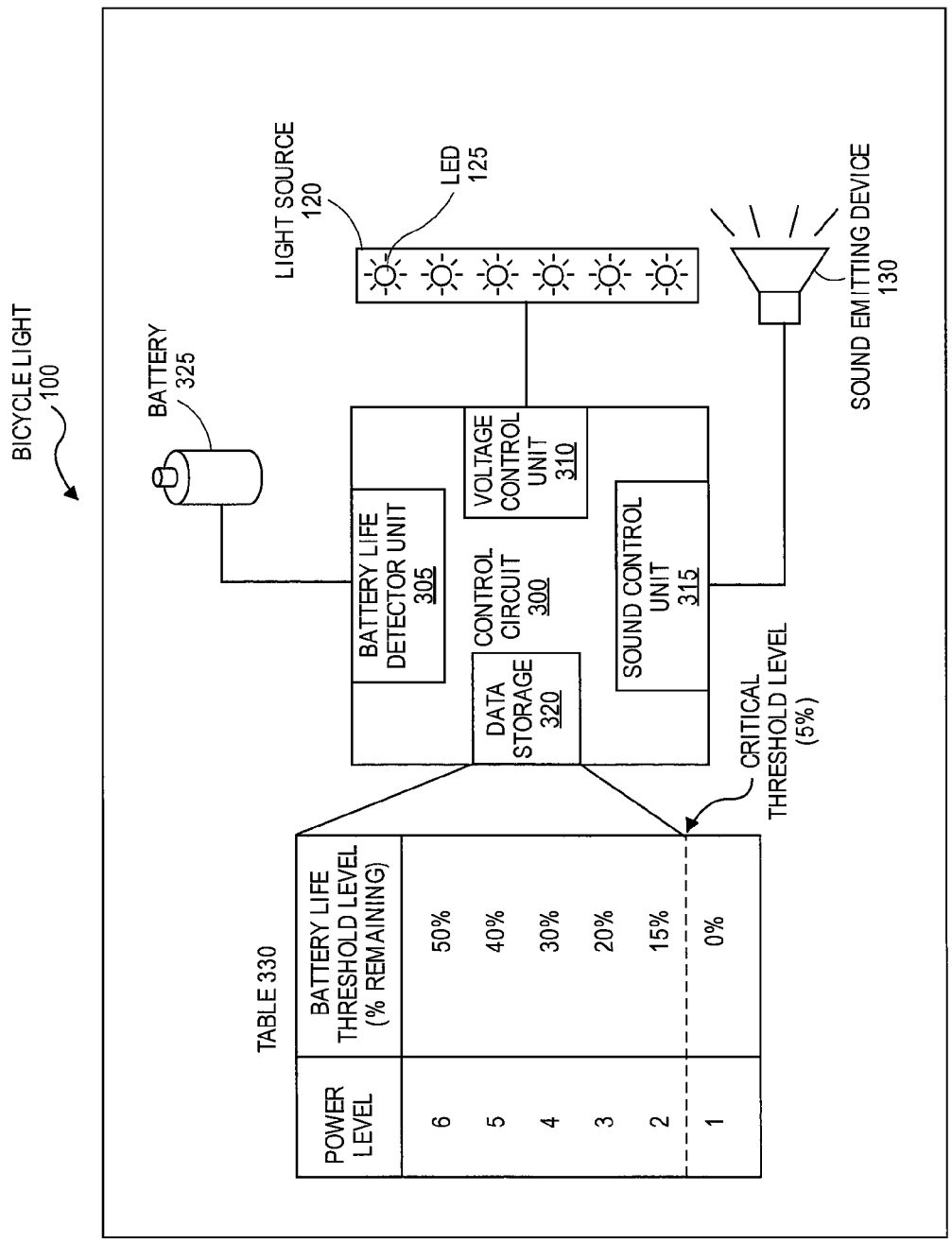
FIG. 3 is a block diagram of a control circuit for the bicycle light and some constituent components of the bicycle light in accordance with an embodiment of the present invention.

FIG. 3 is a block diagram of a control circuit 300 for the bicycle light 100 and some constituent components of the bicycle light 100 in accordance with an embodiment of the present invention. The control circuit 300 includes a battery life detector unit 305, a voltage control unit 310, a sound control unit 315, and data storage 320. The control circuit 300 can be powered by a battery 325 and implemented based on microprocessors, application-specific integrated circuits (ASICs), field-programmable gate arrays (FPGAs), a set of hardware logic structures (e.g., filters, arithmetic logic units, and dedicated state machines), or other types of circuitry. In some embodiments, the battery 325 may also be used to power the light source 120 in addition to the control circuit 300 and other elements of the bicycle light 100.

The battery life detector unit 305 is coupled to the battery 325 and is operable to detect the remaining battery life of the battery 325. In one embodiment, the remaining battery life (or the state-of-charge of the battery 325) may be measured in terms of voltage level of the battery 325, the specific gravity of the battery 325, coulomb count, impedance spectroscopy, and/or magnetism. Based on these measurements the battery life detector unit 305 may measure the percentage of battery life remaining in the battery 325. In one embodiment, the battery life detector unit 305 may measure the length of time that the light source 120 can be powered by the battery 325 at a given power level before the battery 325 dies.

The voltage control unit 310 is coupled to a light source 120 and is operable to apply a voltage across the light source 120 to thereby cause the light source 120 to emit light. In one embodiment, the voltage control unit 310 selectively applies voltage to each individual LED 125 of the light source 120 to control the intensity, color, and blinking pattern of each individual LED 125. In one embodiment, the voltage control unit 310 applies a higher voltage to an LED 125 of the light source 120 when the light source 120 operates at a higher power level (e.g., power level 6) compared to a lower power level (e.g., power level 4). In one embodiment, the voltage control unit 310 activates more LEDs 125 of the light source 120 when the light source 120 operates at a higher power level (e.g., power level 6) compared to a lower power level (e.g., power level 4).

The sound control unit 315 is coupled to a sound emitting device 130 and is operable to control the sound emitted by the sound emitting device 130 (e.g., a speaker). In one embodiment, the sound control unit 315 controls the volume of the sound emitted by the sound emitting device 130. Preferably, the sound emitting device 130 is capable of emitting sound at a volume that is audible to a user (e.g., bicycle rider) when the bicycle light 100 is attached to a bicycle and the bicycle and user are in motion.

The data storage 320 stores data relevant to the operation of the bicycle light 100. In one embodiment, the data storage 320 can be implemented as non-volatile random access memory (RAM). As shown in FIG. 3, in one embodiment, the data storage 320 stores a table 330 that associates each power level with a battery life threshold level. The first column of the table 330 shown in FIG. 3 indicates a power level. In this example, the table 330 includes six discrete power levels (i.e., power levels 1-6), as previously described herein above. The second column of the table 330 indicates a corresponding battery life threshold level for each power level. In this example, power level 6 (i.e., high steady light) has a corresponding battery life threshold level of 50 percent, power level 5 (i.e., medium steady light) has a corresponding battery life threshold level of 40 percent, power level 4 (i.e., low steady light) has a corresponding battery life threshold level of 30 percent, power level 3 (i.e., high flashing light) has a corresponding battery life threshold level of 20 percent, power level 2 (i.e., medium flashing light) has a corresponding battery life threshold level of 15 percent, and power level 1 (i.e., low flashing light) has a corresponding battery life threshold level of 0 percent. In one embodiment, the battery life threshold level corresponding to the lowest power level (i.e., power level 1) may have a null value or placeholder value by which a 0 percent value can be inferred as in the examples provided below, this lowest threshold is not utilized. In one embodiment, the data storage 320 may also store a critical threshold level. The critical threshold level is a battery life threshold level at which the battery life is deemed to be critically low. In this example, the critical threshold level is 5 percent. The battery life threshold level values and the value of the critical threshold level are provided by way of example and not limitation. In other embodiments, these values can be configured as desired by a manufacturer and/or user. In this example, the battery life threshold level stored in the table 330 is described in terms of the percentage of battery life remaining in the battery. In another embodiment, the battery life threshold level is described in terms of a length of time that the light source 120 can be powered by the battery 325 at a given power level before the battery 325 dies. In yet another embodiment, the battery life threshold level is described in terms of a voltage level of the battery 325. While the examples provided above illustrate associations between power level and battery life threshold level as being stored in table format, in other embodiments, the associations may be stored in a different format and/or using a different type of data structure.

The control circuit 300 is operable such that when the light source 120 is operating at a given power level and the control circuit 300 detects that the remaining battery life of the battery 325 reaches below the corresponding battery life threshold level for that power level (e.g., using battery life detector unit 305), then the control circuit 300 causes the sound emitting device 130 to emit sound (e.g., using sound control unit 315), thereby alerting the user (e.g., bicycle rider) that the remaining battery life has reached below the threshold level for that power level. If the control circuit 300 subsequently detects user input, then the control circuit 300 causes the light source 120 to operate at a power level that consumes less power than the current power level (i.e., a lower power level than the current power level) (e.g., using voltage control unit 310), thus prolonging the battery life. For example, in one embodiment, the user input may be an actuation of the button 115 such as a single-click of the button 115, a double-click of the button 115, a holding down of the button 115 for a predetermined period of time, or some other user action with respect to the button 115. In another embodiment, the user input is a predetermined command phrase spoken by the user. In such an embodiment, the bicycle light 100 may include a microphone and speech-recognition circuitry to detect the user's speech. Similar operations are performed at the new power level and subsequent power levels such that the user can gradually ramp down the power level in response to sound emitted by the sound emitting device 130 and actuation of the button 115.

In one embodiment, the control circuit 300 may continue to cause the sound emitting device 130 to repeatedly emit sound until detecting user input. For example, sound can be emitted every minute to remind the user that the remaining battery life has reached below the threshold level for the current power level. During this time, the light source 120 continues to operate at the current power level. When user input is subsequently detected, the control circuit 300 causes the light source 120 to operate at a power level that consumes less power than the current power level. In one embodiment, the control circuit 300 is operable to select the adjacent power level (i.e., the next lower power level) to be the new power level. In one embodiment, the control circuit 300 is operable to skip one or more discrete power levels. The selection of the new power level may be based on the current remaining battery life of the battery 325 at the time user input is detected. For example, the control circuit 300 may select the highest power level for which the corresponding battery life threshold level has not been reached to be the new power level. Examples of how the bicycle light 100 may select the new power level will be provided further below.

In one embodiment, if the control circuit 300 detects that the remaining battery life of the battery 325 has reached below the critical battery life threshold level, then the control circuit 300 causes the sound emitting device 130 to repeatedly emit sound, regardless of the current power level. For example, sound can be emitted every second to remind the user that the remaining battery life has reached below the critical threshold level. In one embodiment, sound is repeated more frequently (i.e., at a higher time-frequency) when the remaining battery life reaches below the critical battery life threshold level than when the battery life reaches below a standard battery life threshold level (i.e., the battery life threshold levels associated with a power level).

In some embodiments, user input is not required to ramp down the power level. For example, in one embodiment, the control circuit 300 is operable to automatically (i.e., without detecting user input) cause the light source 120 to operate at a power level that consumes less power than the current power level upon detecting that the remaining battery life of the battery 325 has reached below the battery life threshold level for the current power level. In one embodiment, the control circuit is operable to cause the sound emitting device 130 to emit sound when the light source 120 automatically transitions to a lower power level. In some embodiments, no sound is emitted during such transitions.

An exemplary operation of a bicycle light 100 will be described below to further illustrate the advantages of some of the embodiments described herein. For purposes of illustration, assume that a user (e.g., a bicycle rider) turns on the bicycle light 100 and configures the bicycle light 100 (more specifically, the light source 120 of the bicycle light 100) to operate at power level 6 (i.e., high steady light). After operating at power level 6 for a period of time, the remaining battery life of the battery 325 eventually reaches below the battery life threshold level for power level 6. That is, the remaining battery life reaches below 50 percent. As a result, the bicycle light 100 starts emitting sound to alert the user that the remaining battery life has reached below the battery life threshold level for the current power level. Shortly thereafter, the user actuates the button 325 of the bicycle light 100, which causes the bicycle light 100 to operate at the next lower power level (i.e., power level 5: medium steady light), thereby prolonging the life of the current charge of the battery 325. After operating at power level 5 for a period of time, the remaining battery life eventually reaches below 40 percent, at which time the bicycle light 100 starts emitting sound again to alert the user that the remaining battery life has reached below the battery life threshold level for the current power level. However, this time the user decides not to actuate the button 115, thus keeping the bicycle light 100 operating at power level 5. The bicycle light 100 repeatedly emits sound (e.g., every minute) to remind the user that the remaining battery life is below the battery life threshold level for the current power level until the user actuates the button 115. After operating at power level 5 for a period of time, the remaining battery life eventually reaches below 20 percent. The user finally actuates the button 115, which causes the bicycle light 100 to operate at the highest power level for which the corresponding battery life threshold level has not been reached. In this example, the actuation of the button 115 causes the bicycle light 100 to operate at power level 2 (since the 15 percent threshold has not been reached yet), thereby effectively skipping power levels 4 and 3. The actuation of the button 115 also causes the bicycle light 100 to stop emitting sound. After operating at power level 2 for a period of time, the remaining battery life eventually reaches below 15 percent, at which time the bicycle light 100 starts emitting sound again to alert the user that the remaining battery life has reached below the battery life threshold level for the current power level. At this point in time, the user is almost done with his or her ride so the user decides not to actuate the button 115. When the remaining battery life reaches below the critical threshold (i.e., 5 percent), the bicycle light 100 starts repeatedly emitting sound (e.g., every second) to alert the user that the remaining battery life has reached below the critical threshold level. Absent any user input, the bicycle light 100 continues to operate at the current power level, then shuts off when the battery 325 dies. In this fashion, the user may ramp down the power level each time the bicycle light 100 emits sound until the battery 325 dies. The user can actuate the button 115 to ramp down to a lower power level or choose to operate at the current power level if the user is almost finished with the ride. Thus, this embodiment of the bicycle light 100 described above provides an advantage that the user is audibly notified when the remaining battery life reaches below certain threshold levels and gives the user the option to ramp down to a lower power level in order to prolong battery life or to stay at the current power level.

Another exemplary operation of a bicycle light 100 will be described below to further illustrate the advantages of some of the embodiments described herein. For purposes of illustration, assume that a user (e.g., bicycle rider) turns on the bicycle light 100 and configures the bicycle light 100 (more specifically, the light source 120 of the bicycle light 100) to operate at power level 6 (i.e., high steady light). After operating at power level 6 for a period of time, the remaining battery life of the battery 325 eventually reaches below the battery life threshold level for power level 6. That is, the remaining battery life reaches below 50 percent. As a result, the bicycle light 100 automatically ramps down to the next lower power level (i.e., power level 5: medium steady light). In a similar fashion, when the remaining battery life reaches below the battery life threshold level for power level 5 (i.e., 40 percent), the bicycle light 100 automatically ramps down to the next lower power level (i.e., power level 4: low steady light). The bicycle light 100 continues to automatically ramp down to the next lower power level in this way until the bicycle light 100 reaches the lowest power level and the battery eventually dies. Thus, this embodiment of the bicycle light 100 provides an advantage that the battery life is prolonged by automatically transitioning to lower power levels without requiring user input.

Although the examples described above and other examples provided herein describe an embodiment where the highest battery life threshold level is 50 percent remaining battery life, other embodiments may have battery life threshold levels that are higher than 50 percent. In general, having higher battery life threshold levels will cause the light source to ramp down to lower power levels earlier in the life of the battery, thus providing the benefit of further prolonging the battery life.

Figure 4:
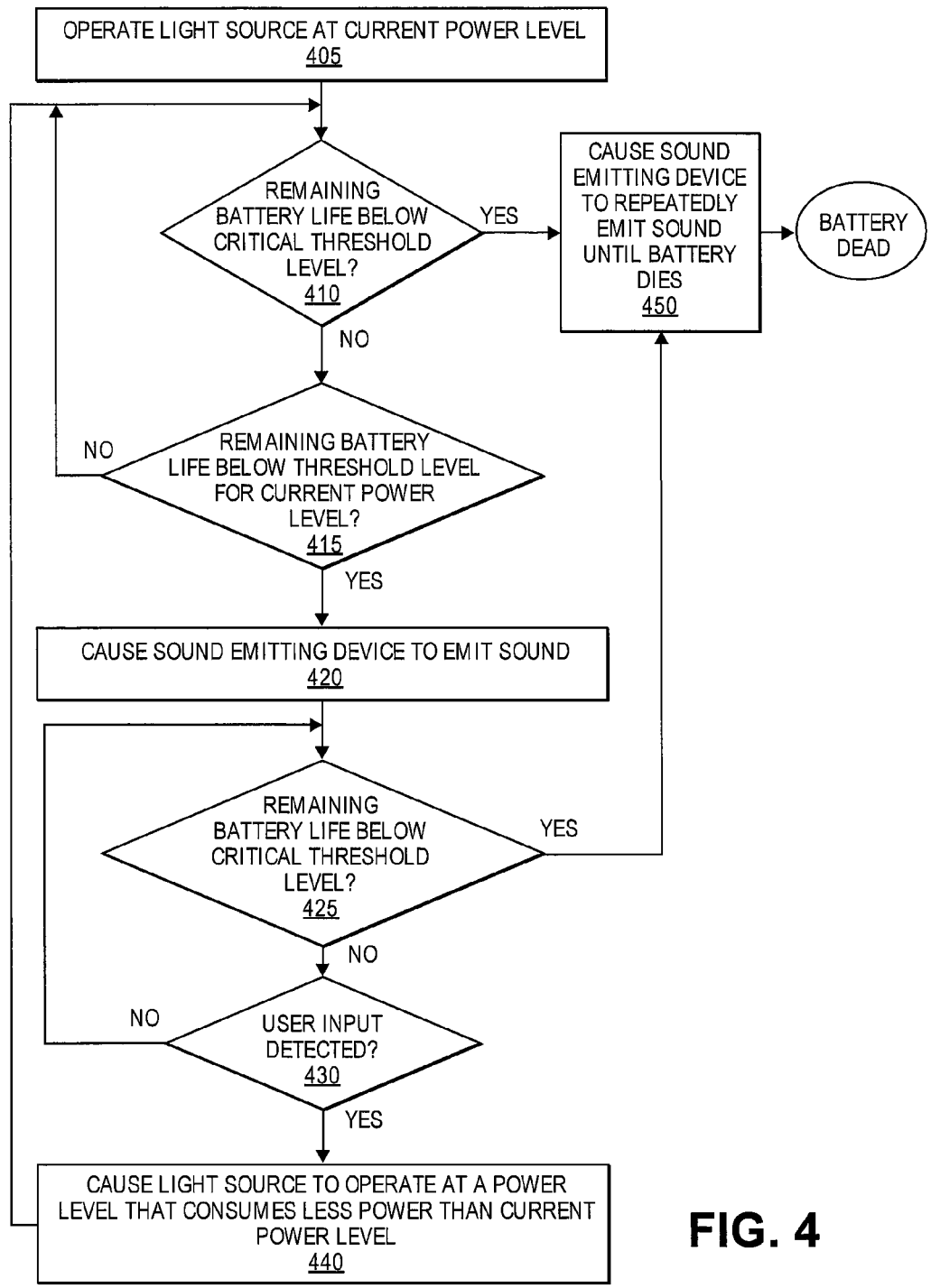
FIG. 4 is a flow diagram illustrating operations performed by the control circuit of the bicycle light in accordance with an embodiment of the present invention.

FIG. 4 is a flow diagram illustrating operations performed by the control circuit 300 of the bicycle light 100 in accordance with an embodiment of the present invention. The control circuit 300 operates a light source 120 at a current power level (block 405). The control circuit 300 thereafter determines whether the remaining battery life of the battery 325 is below the critical threshold level (decision block 410). If so, then the control circuit 300 causes the sound emitting device 130 to repeatedly emit sound until the battery 325 dies (block 450). This sound alerts the user (e.g., bicycle rider) that the battery 325 is critically low on battery life.

Returning to decision block 410, if the remaining battery life of the battery 325 is not below the critical threshold level, then the control circuit 300 determines whether the remaining battery life of the battery 325 is below the battery life threshold level for the current power level (decision block 415). If not, then the control circuit 300 repeats decision blocks 410 and 415 until one of the threshold levels is met. Returning to decision block 415, if the remaining battery life of the battery 325 is below the battery life threshold level for the current power level, then the control circuit 300 causes the sound emitting device 130 to emit sound (block 420). This sound alerts the user that the remaining battery life has reached below the threshold level for the current power level.

The control circuit 300 determines whether the remaining battery life of the battery 325 is below the critical threshold level (decision block 425). If so, then the control circuit 300 causes the sound emitting device 130 to repeatedly emit sound until the battery 325 dies (block 450). This alerts the user (e.g., bicycle rider) that the battery is critically low on battery life. Returning to decision block 425, if the remaining battery life of the battery 214 is not below the critical threshold level, then the control circuit 300 determines whether user input has been detected (decision block 430). If not, then the control circuit 300 repeats decision blocks 425 and 430 until detecting user input. If user input is detected, then the control circuit 300 causes the light source 120 to operate at a power level that consumes less power than the current power level (block 440). The control circuit 300 is operative to repeat blocks 410-440 for subsequent power levels, to thereby ramp down the power level in response to user input until the remaining battery life reaches below the critical threshold level and the battery 325 eventually dies.

Embodiments described above with reference to FIG. 4 provide an advantage that the user is audibly notified when the remaining battery life reaches below certain threshold levels. As such, the user (e.g., bicycle rider) is made aware of the status of the battery 325 without having to look at the bicycle light 100 while riding the bicycle 200 (e.g., looking back at the bicycle light 100 when the bicycle light 100 is attached to a rear portion of the bicycle 200), which can be dangerous. Also, the user is given the option to ramp down the light source 120 to a lower power level in response to the audible notification to prolong battery life. The user may choose to ramp down the light source 120 to a lower power level or may choose to stay at the current power level.

Figure 5:
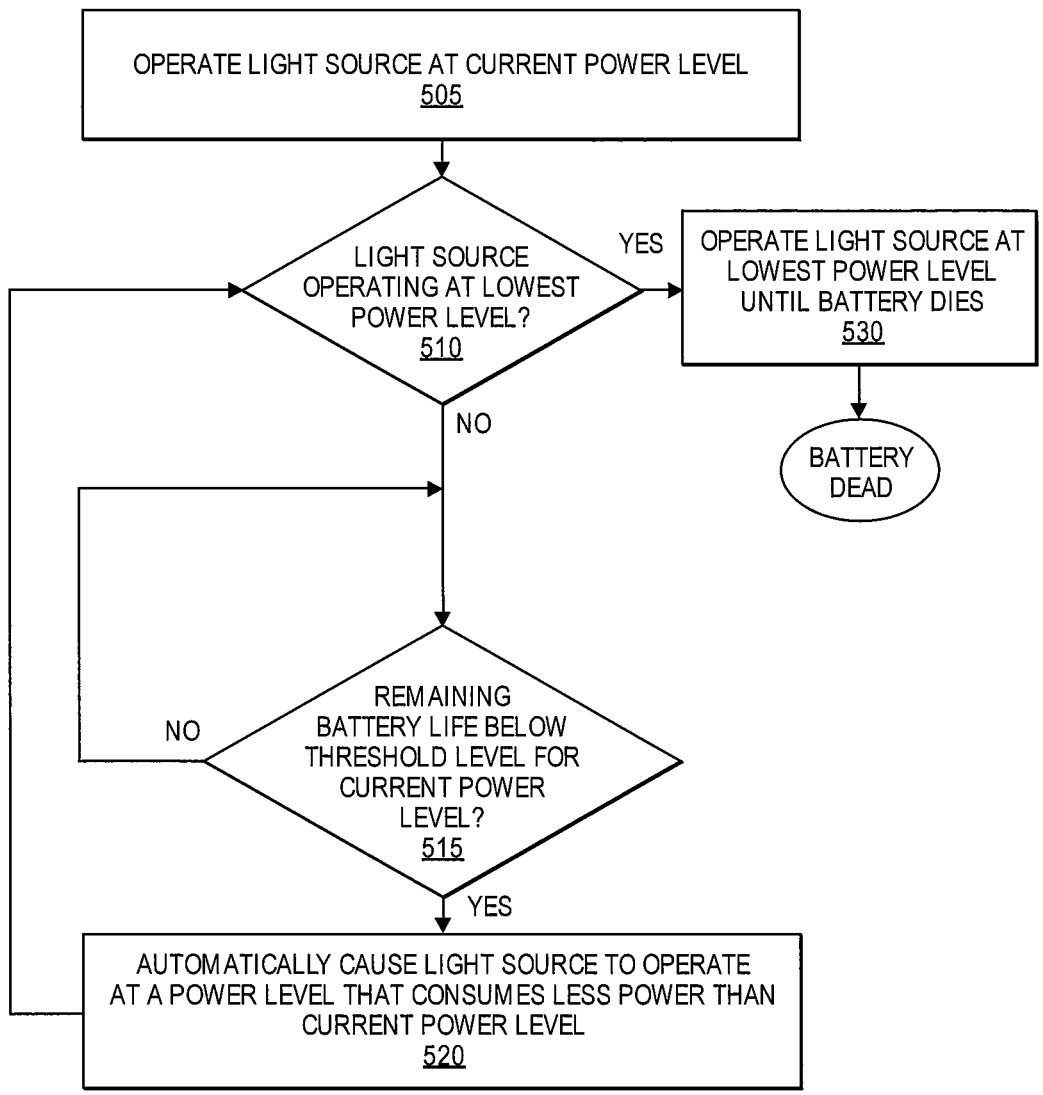
FIG. 5 is a flow diagram illustrating operations performed by the control circuit of the bicycle light in accordance with another embodiment of the present invention.

FIG. 5 is a flow diagram illustrating operations performed by the control circuit 300 of the bicycle light 100 in accordance with another embodiment of the present invention. The control circuit 300 operates a light source 120 at a current power level (block 505). The control circuit 300 determines whether the light source 120 is operating at the lowest power level (decision block 510). If so, then the control circuit 300 operates the light source at the lowest power level until the battery 325 dies (block 530). Returning to decision block 510, if the light source 120 is not operating at the lowest power level, then the control circuit 300 determines whether the remaining battery life of the battery 325 is below the battery life threshold level for the current power level (decision block 515). If not, then the control circuit 300 waits until the remaining battery life of the battery 325 reaches below the threshold level for the current power level. When the remaining battery life of the battery 325 reaches below the threshold level for the current power level, the control circuit 300 automatically (i.e., without waiting for user input) causes the light source 120 to operate at a power level that consumes less power than the current power level (block 520). The control circuit repeats blocks 510-520 for subsequent power levels to thereby automatically ramp down the power level until the light source 120 operates at the lowest power level and the battery 325 eventually dies.

Embodiments described above with reference to FIG. 5 provide an advantage that the battery life can be prolonged by automatically ramping down the light source 120 to lower power levels without requiring user input.

An embodiment of the invention may be an article of manufacture in which a machine-readable storage medium (such as microelectronic memory) has stored thereon instructions which program one or more data processing components (i.e., a processor) to perform the operations described above. In other embodiments, some of these operations might be performed by specific hardware components that contain hardwired logic. Those operations might alternatively be performed by any combination of programmed data processing components and fixed hardwired circuit components.

While certain embodiments described in the present disclosure are primarily described in the context of bicycle lights, the arrangements and operations described above can be applied to other types of lights without departing from the principles and spirit of the present disclosure.

Also, while certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A bicycle light comprising:
    a battery;
    a light source that when powered by the battery is capable of operating at a first power level and a second power level, wherein the second power level consumes less power than the first power level and wherein the first power level is associated with a first battery life threshold level;
    a sound emitting device; and
    a control circuit operable to:
        detect that a remaining battery life of the battery has reached below the first battery life threshold level,
        cause the sound emitting device to emit sound when the remaining battery life of the battery reaches below the first battery life threshold level while the light source is operating at the first power level, and
        cause the light source to operate at the second power level upon detecting a user input, wherein the user input occurs after detecting the remaining battery life of the battery has reached below the first battery life threshold level, and
        wherein the light source comprises a plurality of light-emitting diodes (LEDs), and wherein more LEDs of the light source are activated when the light source operates at the first power level than at the second power level.

2. The bicycle light of claim 1, wherein the control circuit is further operable to cause the sound emitting device to emit sound at a first time-frequency until detecting the user input.

3. The bicycle light of claim 2, wherein the control circuit is further operable to cause the sound emitting device to emit sound at a second time-frequency upon detecting that the remaining battery life of the battery has reached below a critical battery life threshold level, wherein the second time-frequency is higher than the first time-frequency.

4. The bicycle light of claim 1, further comprising:
    a button, wherein the user input is an actuation of the button.

5. The bicycle light of claim 4, wherein the user input is a single-click of the button.

6. The bicycle light of claim 1, wherein the first battery life threshold level is a percentage of battery power remaining in the battery.

7. The bicycle light of claim 1, wherein the first battery life threshold level is a length of time that the light source is capable of operating at the first power level.

8. The bicycle light of claim 1, wherein a higher voltage is applied to at least one of the LEDs when the light source operates at the first power level than at the second power level.

9. The bicycle light of claim 1, wherein the first power level and second power level are adjacent power levels.

10. The bicycle light of claim 1, wherein one or more discrete power levels exist between the first power level and the second power level.

11. The bicycle light of claim 1, wherein the control circuit is further operable to determine the second power level based on the remaining battery life of the battery.

12. The bicycle light of claim 1, wherein the light source is capable of operating at a third power level, wherein the third power level consumes less power than the second power level and wherein the second power level is associated with a second battery life threshold level, wherein the control circuit is further operable to:
    detect that the remaining battery life of the battery has reached below the second battery life threshold level,
    cause the sound emitting device to emit sound when the remaining battery life of the battery reaches below the second battery life threshold level while the light source is operating at the second power level, and
    cause the light source to operate at the third power level upon detecting a user input.

13. A bicycle light comprising:
    a battery;
    a light source that when powered by the battery is capable of operating at least at a first power level, a second power level, and a third power level, wherein the third power level consumes less power than the second power level and the second power level consumes less power than the first power level, and wherein the first power level is associated with a first battery life threshold level, the second power level is associated with a second battery life threshold level different from the first battery life threshold level, and the third power level is associated with a third battery life threshold level different than the first and second battery life threshold levels; and
    a control circuit operable to:

detect that a remaining battery life of the battery has reached below the first battery life threshold level, automatically cause the light source to operate at the second power level upon detecting that the remaining battery life of the battery has reached below the first battery life threshold level, detect that the remaining battery life of the battery has reached below the second battery life threshold level, and automatically cause the light source to operate at the third power level upon detecting that the remaining battery life of the battery has reached below the second battery life threshold level.

14. The bicycle light of claim 13, wherein the first battery life threshold level is a percentage of battery power remaining in the battery.

15. The bicycle light of claim 13, wherein the first battery life threshold level is a length of time that the light source is capable of operating at the first power level.

16. The bicycle light of claim 13, wherein the light source comprises a plurality of light-emitting diodes (LEDs), and wherein more LEDs of the light source are activated when the light source operates at the first power level than at the second power level.

17. The bicycle light of claim 13, wherein the light source comprises a light-emitting diode (LED), and wherein a higher voltage is applied to the LED when the light source operates at the first power level than at the second power level.

18. The bicycle light of claim 13, wherein the bicycle light is a tail light.

19. A bicycle tail light comprising:

a battery;

a light source that when powered by the battery is capable of operating at a plurality of power levels, wherein each power level is associated with a different battery life threshold level;

a sound emitting device; and a control circuit operable to:

automatically cause the light source to operate at a next power level and cause the sound emitting device to emit sound upon detecting that a remaining battery life of the battery reaches below a first battery life threshold level associated with a current power level of the light source and upon detecting that a remaining battery life of the battery reaches below a second battery life threshold level associated with the next power level of the light source, wherein the next power level consumes less power than the current power level and the second battery life threshold level is a percentage of battery power remaining in the battery that is less than a percentage of battery power remaining in the battery when the battery is at the first battery life threshold level.

* * * * *